July 10, 1934.  H. J. SIEVERS  1,966,052
FLUE SCRAPER
Filed Nov. 15, 1933
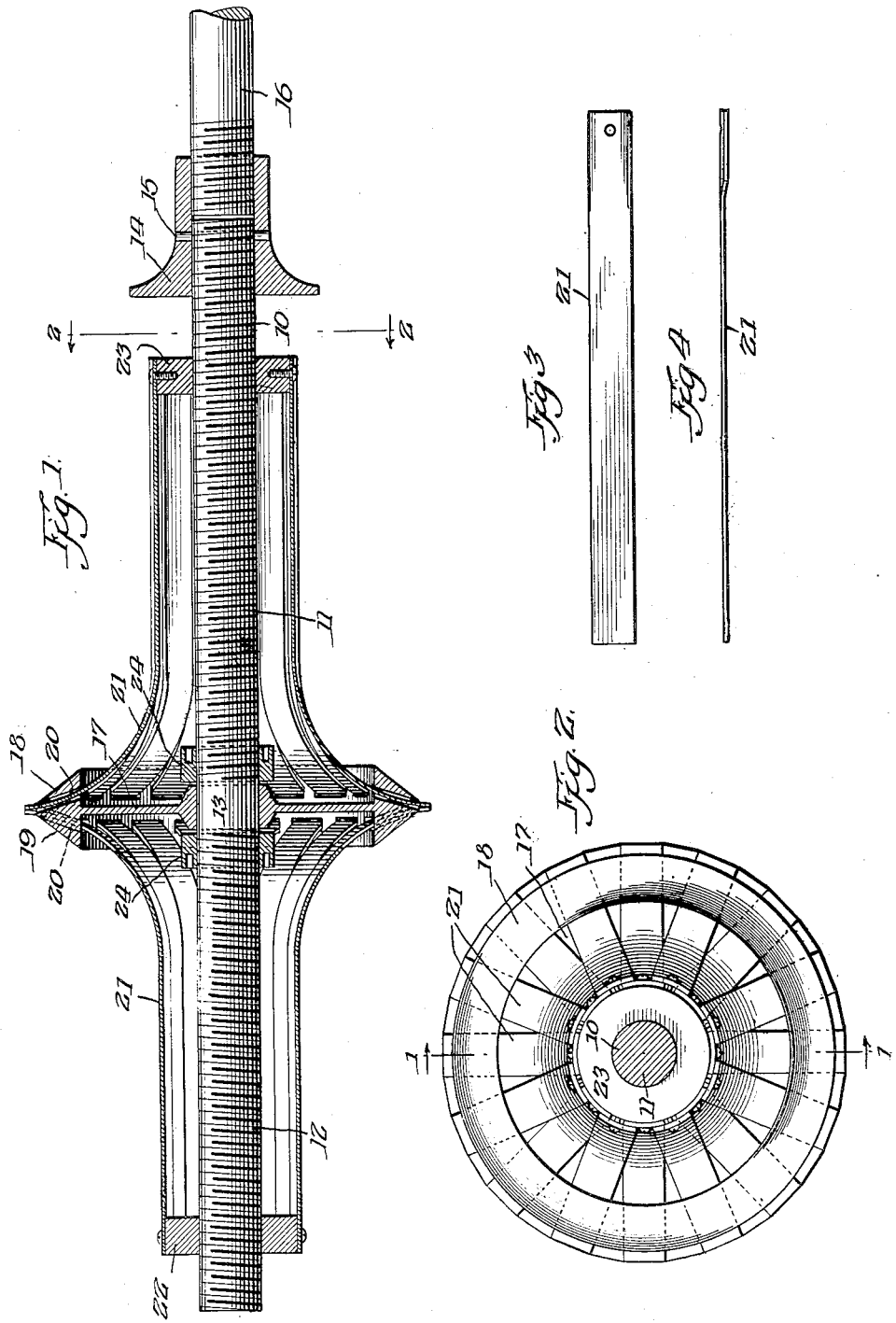
Inventor:
Henry J. Sievers
By Murray & Murray
Att'ys Patented July 10, 1934

1,966,052

UNITED STATES PATENT OFFICE 1,966,052

FLUE SCRAPER

Henry J. Sievers, Evanston, Ill.

Application November 15, 1933, Serial No. 698,071

3 Claims. (Cl. 15—104.19)

My invention relates to flue scrapers and particularly to a novel device of simple form adapted to present sharp cutting edges, the adjustment of which may be effected by simple manipulation. The device of my invention is so constructed as to provide a plurality of flexible blades adapted to be mounted so as to project radially and resiliently through a support and being held in such manner that by screw action the effective diameter of the scraper may be changed as required.

In the preferred form of the invention two sets of the blades are employed with their ends in overlapping positions. Thus the danger of breakage of any one of the blades is reduced to a minimum.

Other features of novelty in the construction and operation will be pointed out in the following description.

The invention will be more readily understood by reference to the accompanying drawing, in which:

Fig. 1 is a longitudinal sectional view through a scraper constructed in accordance with my invention;

Fig. 2 is an end elevation partly in section taken on the line 2—2 of Fig. 1, and Figs. 3 and 4 are views of the blades employed.

In the drawing it will be seen that I provide an axial rod 10 having right hand threads 11 on one end and left hand threads 12 on the opposite end, a middle portion 13 being unthreaded. A shank 14 in the form of a nut is permanently held in place on the rod by means of a pin 15. This member provides a threaded socket for a flue rod 16. Mounted on the unthreaded portion 13 of the rod is a circular or disc-like support 17 having its peripheral portion enlarged to provide the inclined surfaces 18, 19 to assist in entering a flue. This enlarged portion has a large number of inclined radial slits 20 therein for the accommodation of the scraper strips 21 two sets of which are shown, one at each side of the support. The strips, one of which is shown in Figs. 3 and 4, are mounted by means of screws or rivets on nuts 22, 23 that engage the axial rod at the respective ends, these nuts co-operating with the right and left hand threads on the opposite end portions of the rod. If a relatively large number of blades or strips are used, as shown in the drawing, they will overlie, as shown in Fig. 1, at their point of attachment to the nuts. The support 17 is held against longitudinal movement on the rod by means of the nuts 24, the nuts being so positioned and held in place that the rod and support are capable of relative rotation.

With the parts in the position shown, it will be seen that by rotating the scraper rod 16 and consequently the axial rod 10, the support and attached strips or blades being held against rotation, the two nuts 22, 23 will be caused to approach the support, thus forcing the blades radially outward and increasing the extent of projection of the blades beyond the periphery of the support. In this manner the cutting or scraping edges may be adjusted to accommodate different flue conditions and likewise compensate for wear on the projecting ends of the blades.

While the scraping action will entail severe strain on the projecting ends of the blades, it will be noted that the operating ends of the blades are in overlapping or self-supporting relation; that is to say, the ends of the blades at one side of the support overlap the blades on the opposite side. Of course, this is not essential but in any event it is recommended that the blades be arranged to provide a complete peripheral cutting edge.

The device is adapted to be of rugged construction and the parts are so arranged that breakage of a blade enables replacement with ease. Furthermore, it is obvious that changes in the construction may be made and I do not wish to be limited except as indicated in the appended claims.

I claim:

1. In a flue scraper, the combination of a threaded axial rod, a circular support mounted on the rod, means adapted to fix said support against longitudinal movement but with capacity for relative rotation thereon, said support having a plurality of substantially radial slits therein, a nut threaded on the rod in spaced relation to said support, a plurality of spring metal strips fixed to the nut and sprung so that their opposite ends project substantially radially through the slits in said support, and for a relatively short distance beyond the support, whereby when the rod is rotated relative to the nut and support the nut is drawn closer to the support and the strips are caused to have a greater projection beyond the periphery of the support, the position of the strips being such that the ends thereof constitute the cutting edges.

2. In a device of the class described, the combination of a threaded axial rod, a disc-like member having substantially radial slits in its rim, means securing said member on said rod against longitudinal movement and with capacity for relative rotation, a nut threaded on said rod and spaced away from said member, a plurality of spring metal strips secured to said nut and sprung at the ends opposite the attached ends to project substantially radially through the slits in said member, the rotation of said rod acting on said nut to draw the same and said strips toward said member whereby the bent ends of said strips are caused to project a greater distance beyond the periphery of said member, the position of the strips being such that the ends thereof constitute the cutting edges.

3. In a flue scraper, the combination of an axial rod having right and left hand threads on the respective end portions thereof, said rod being adapted to be connected to a flue rod, a circular support mounted near the middle of said rod, means for holding said support on the rod against longitudinal movement with capacity for relative rotation between said rod and support, a pair of nuts threaded on said rod and spaced on the opposite sides of said supports, and a plurality of spring strips secured at one end to said nuts and sprung to project substantially radially through the support, the strips mounted on one side of said support overlapping the strips mounted on the opposite side of said support at the point of projection through the support, the arrangement being such that upon rotation of the rod both said nuts are advanced toward the support and the strips are projected through the periphery of the support, the ends of the strips constituting the cutting edges.

HENRY J. SIEVERS.